United States Patent
Hawkinson et al.

(10) Patent No.: US 10,989,043 B2
(45) Date of Patent: Apr. 27, 2021

(54) DEVICE AND METHOD FOR SURVEYING BOREHOLES OR ORIENTING DOWNHOLE ASSEMBLIES

(71) Applicant: Scientific Drilling International, Inc., Houston, TX (US)

(72) Inventors: Benjamin Curtis Hawkinson, Paso Robles, CA (US); Brian Daniel Gleason, Atascadero, CA (US)

(73) Assignee: SCIENTIFIC DRILLING INTERNATIONAL, INC., Houston, TX (US)

( * ) Notice: Subject to any disclaimer, the term of this patent is extended or adjusted under 35 U.S.C. 154(b) by 304 days.

(21) Appl. No.: 15/915,966

(22) Filed: Mar. 8, 2018

(65) Prior Publication Data

US 2018/0258752 A1     Sep. 13, 2018

Related U.S. Application Data

(60) Provisional application No. 62/468,889, filed on Mar. 8, 2017.

(51) Int. Cl.
| | |
|---|---|
| *E21B 47/022* | (2012.01) |
| *G01C 17/00* | (2006.01) |
| *E21B 47/024* | (2006.01) |
| *E21B 47/18* | (2012.01) |
| *G01C 21/20* | (2006.01) |
| *G01C 17/28* | (2006.01) |
| *E21B 47/13* | (2012.01) |

(52) U.S. Cl.
CPC ......... *E21B 47/022* (2013.01); *E21B 47/024* (2013.01); *G01C 17/00* (2013.01); *E21B 47/13* (2020.05); *E21B 47/18* (2013.01); *G01C 17/28* (2013.01); *G01C 21/20* (2013.01)

(58) Field of Classification Search
CPC ....................................... E21B 47/022
USPC ....................................... 73/152.43
See application file for complete search history.

(56) References Cited

U.S. PATENT DOCUMENTS

| | | | |
|---|---|---|---|
| 4,141,153 A | 2/1979 | Nelson | |
| 2003/0070844 A1* | 4/2003 | Radzinski | E21B 7/067 175/61 |
| 2008/0151690 A1* | 6/2008 | Tang | G01V 1/44 367/35 |
| 2008/0156485 A1 | 7/2008 | Phillips et al. | |
| 2009/0090555 A1* | 4/2009 | Boone | E21B 44/02 175/45 |
| 2010/0295703 A1 | 11/2010 | Weston et al. | |
| 2016/0281493 A1* | 9/2016 | Kuckes | E21B 47/024 |

OTHER PUBLICATIONS

International Search Report and Written Opinion issued in international application No. PCT/US2018/021585 dated May 23, 2018 (7 pages).

* cited by examiner

*Primary Examiner* — Walter L Lindsay, Jr.
*Assistant Examiner* — Philipmarcus T Fadul
(74) *Attorney, Agent, or Firm* — Locklar PLLC

(57) ABSTRACT

A heading transfer unit may be used to transfer a heading from a surface base to a MWD tool. The surface base may have a master north finder to determine a heading. The heading may be transferred to the heading transfer unit, which is in turn transferred to the MWD unit. The heading on the heading transfer unit is transferred to the MWD tool.

15 Claims, 1 Drawing Sheet

DEVICE AND METHOD FOR SURVEYING BOREHOLES OR ORIENTING DOWNHOLE ASSEMBLIES

CROSS REFERENCE TO RELATED APPLICATIONS

This application is a U.S. non-provisional application which claims priority from U.S. provisional application No. 62/468,889, filed Mar. 8, 2017, which is incorporated by reference herein in its entirety.

TECHNICAL FIELD/FIELD OF THE DISCLOSURE

The present disclosure relates to establishment of orientation of a downhole tool.

BACKGROUND OF THE DISCLOSURE

Current measurement while drilling (MWD) and gyroMWD techniques include a variety of sensors which are deployed into a borehole with a drilling assembly. These systems are designed to acquire headings on demand, and transmit these headings to surface via MWD telemetry (typically Mud Pulse or Electromagnetic). Standard MWD tools typically acquire headings using magnetic field sensors and acceleration sensors and, along with models of the Earth's magnetic and gravity fields, compute an instrument heading. Current gyroMWD techniques replace the magnetometers with a gyrocompass assembly, which uses a rate gyroscope to measure the direction of the Earth's rotation vector relative to the tool, and combine these with acceleration sensors (as in standard MWD tools) to compute an instrument heading. When using either method, the instrument must generally be kept still during the sampling period, to eliminate effects from movement and isolate acceleration due to gravity, and in the case of the gyroMWD method, to isolate Earth's rotation. Additionally, when using a standard MWD tool, the instrument can only be used when spaced sufficiently from external sources of magnetic interference (e.g. offset wellbores) to ensure that the modeled Earth's magnetic field is undisturbed.

SUMMARY

The present disclosure provides for a method. The method may include providing a master north finder. The master north finder may be positioned at the surface and coupled to a surface base. The method may include determining a heading with respect to true north and gravity with the master north finder. The method may include transferring the heading to a heading transfer unit. The heading transfer unit may include a non-transitory, tangible, computer readable memory media adapted to store the heading and a base alignment feature. The base alignment feature may be coupleable to the surface base. The method may include transferring the heading transfer unit to a MWD tool. The MWD tool may include a MWD interface having a MWD interface alignment feature, such that the base alignment feature engages the MWD interface alignment feature. The method may include transferring the heading from the heading transfer unit to the MWD tool.

The present disclosure also provides for a system. The system may include a surface base. The system may include a master north finder positioned at the surface and coupled to the surface base. The system may include a MWD tool including a MWD interface including a MWD interface alignment feature. The system may include a heading transfer unit. The heading transfer unit may include a non-transitory, tangible, computer readable memory media adapted to store a heading and a base alignment feature coupleable to the surface base and the MWD interface alignment feature.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
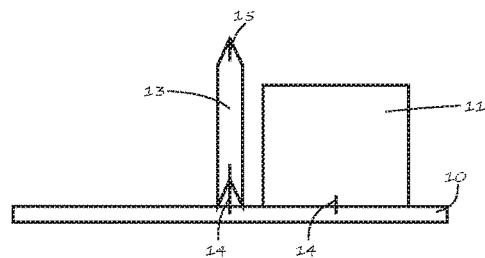
FIG. 1 depicts a schematic view of a heading transfer unit and base consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

With reference to FIG. 1, heading transfer unit 13 may be configured as a dart or other device deployable into a wellbore. In some embodiments, heading transfer unit 13 may include a pressure vessel. Heading transfer unit 13 may include a MEMS-based AHRS navigation unit. Heading transfer unit 13 may include non-transitory, tangible, computer readable memory media adapted to store one or more pieces of data such as a heading or inclination as discussed below. In some embodiments, heading transfer unit 13 may include a processor, such as a microprocessor, microcontroller, FPGA, ASIC, or otherwise. In some embodiments, heading transfer unit 13 may include one or more sensors including, for example and without limitation, one or more magnetometers, accelerometers, or gyro sensors. In some embodiments, heading transfer unit 13 may include a power supply including, for example and without limitation, a battery. In some embodiments, heading transfer unit 13 may include one or more defined orientation features including, for example and without limitation, one or more scribes, keyways, or other interfaces used to align heading transfer unit 13 with other tools.

Heading transfer unit 13 may include base alignment feature 14. Base alignment feature 14 may, for example and without limitation, allow for positioning and alignment of heading transfer unit 13 on other tools as discussed below. Base alignment feature 14 may be a pin, scribe, keyway, hole, slot, groove, key seat, or other mechanical feature used to align heading transfer unit 13 with other tools. The other tools may contain a mating mechanical feature such as a pin, scribe, keyway, hole, slot, groove, or key seat. In some embodiments base alignment feature 14 may also contain electronics and sensors that enable heading transfer unit 13 to determine its orientation with respect to the mated tool. In some embodiments, base alignment feature 14 may allow for data transfer between heading transfer unit 13 and other tools as discussed below. In some embodiments, heading transfer unit 13 may communicate by central hub, over wireline, or via other electrical or wireless methods known in the art.

In some embodiments, heading transfer unit 13 may be used to transfer a known heading to downhole MWD tool 20 as shown in FIGS. 2-5 positioned within drill string 16 within wellbore 17 from the surface. Drill string 16 may be a drill string, tool string, casing string, component thereof, or other downhole tool. In other embodiments, sensors in heading transfer unit 13 may be used by downhole MWD tool 20. In some embodiments, MWD tool 20 may include a continuous gyro survey instrument. A continuous gyro survey instrument may include one or more gyroscope sensors and one or more accelerometer sensors, which may be continuously used to measure changes in azimuth relative to an initial azimuth, with the initial azimuth or heading obtained from heading transfer unit 13. In some embodiments, MWD tool 20 may include MWD interface 21. MWD interface 21 may include alignment feature 22 positioned to receive base alignment feature 14 when heading transfer unit 13 is engaged to MWD tool 20. MWD interface 21 may provide an electromechanical interface for communication between MWD tool 20 and heading transfer unit 13. MWD interface 21 may be positioned at a known alignment relative to MWD tool 20. In some embodiments, alignment feature 22 of MWD interface 21 may provide for a known alignment between heading transfer unit 13 and MWD tool 20. In some embodiments MWD interface alignment feature 22 may be a pin, scribe, keyway, hole, slot, groove, or key seat. In some embodiments MWD interface alignment feature 22 may also include electronics and sensors that enable MWD tool 20 to determine its orientation with respect to heading transfer unit 13 and its base alignment feature 14. In some embodiments, MWD tool 20 may be capable of sending data to the surface by, for example and without limitation, electromagnetic signals or mud pulse telemetry.

In some embodiments, heading transfer unit 13 may be connected to surface base 10. Surface base 10 may include master north finder 11. Master north finder 11 may measure and report its heading with respect to true north and gravity independently. In some embodiments, master north finder 11 may measure and report its heading at least partially in response to a measurement made by heading transfer unit 13. In some embodiments, master north finder 11 may measure, estimate, or obtain its heading with respect to true north and gravity by, for example and without limitation, inertial navigation or gyrocompassing, GPS, visual sighting, optics, or land surveying. Surface base 10 may include one or more electromechanical connections or antennae to allow communication between tools such as master north finder 11 and heading transfer unit 13, charging of heading transfer unit 13, or powering of master north finder 11. In some embodiments the heading and inclination of master north finder 11 may be transferred to heading transfer unit 13 wirelessly.

In some embodiments, in operation, heading transfer unit 13 may be connected to surface base 10. A north-finding exercise may be undertaken using master north finder 11 to establish the heading of master north finder 11 and, because master north finder 11 is mechanically connected to surface base 10, the heading of surface base 10. The heading may be transferred to heading transfer unit 13 through surface base 10 as heading transfer unit 13 is connected to surface base 10 at a known orientation. In some embodiments, while connected to surface base 10, heading transfer unit 13 may be in a "slave" mode, wherein the heading from master north finder 11 is used as the heading reference of heading transfer unit 13. In some embodiments, when in slave mode, the heading reference from the master north finder may be continuously transferred to heading transfer unit 13.

Heading transfer unit 13 may then be switched or commanded into a "navigation" mode, wherein heading transfer unit 13 computes an updated heading reference based on the initial heading received from master north finder 11 and the motion sensed by the internal sensors of heading transfer unit 13.

In some embodiments, heading transfer unit 13 may then be moved through drill string 16 or other casing to mechanically engage MWD tool 20. As heading transfer unit 13 is moved, the internal sensors may measure and continuously track the heading of heading transfer unit 13.

Figure 2:
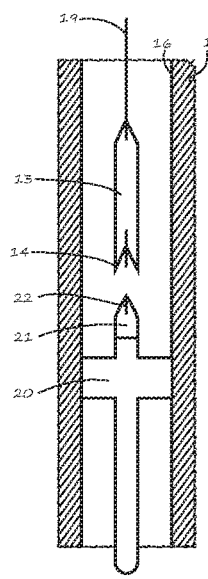
FIG. 2 depicts a heading transfer operation consistent with at least one embodiment of the present disclosure.
Figure 3:
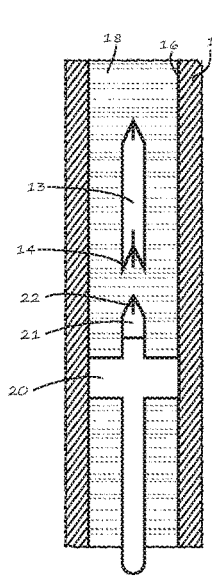
FIG. 3 depicts a heading transfer operation consistent with at least one embodiment of the present disclosure.

In some embodiments, as depicted in FIG. 2, heading transfer unit 13 may be transferred through drill string 16 by wireline or slickline 19. In other embodiments, as depicted in FIG. 3, heading transfer unit 13 may be dropped or pumped through drill string 16 through fluid 18 within drill string 16. In some embodiments, heading transfer unit 13 may contain fins or other mechanical features to control or constrain the physical movement that heading transfer unit 13 is subjected to as heading transfer unit 13 moves through drilling string 16.

Figure 4:
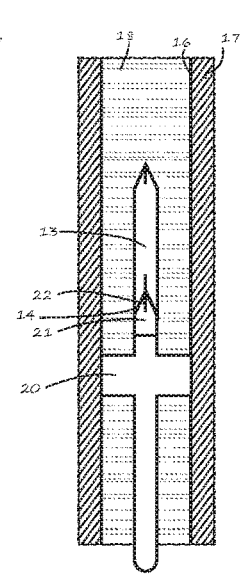
FIG. 4 depicts a heading transfer operation consistent with at least one embodiment of the present disclosure.

Once heading transfer unit 13 reaches MWD tool 20, base alignment feature 14 may engage with alignment feature 22 of MWD interface 21 as depicted in FIG. 4. Heading transfer unit 13 may be at a known alignment relative to MWD tool 20 as discussed above. Heading transfer unit 13 may communicate the measured heading of heading transfer unit 13 to MWD tool 20. In some embodiments, MWD tool 20 may update or calibrate internally-measured heading to that of heading transfer unit 13, and may continue operations. In some embodiments, MWD tool 20 may communicate the heading to the surface using normal telemetry.

In some embodiments, heading transfer unit 13 may be retrieved from drill string 16. In some embodiments, heading transfer unit 13 may remain connected to MWD tool 20. In such an embodiment, the sensors of heading transfer unit 13 may be used by MWD tool 20 to, for example and without limitation, provide real-time axial rate data to MWD tool 20. The real-time axial rate data may be used, for example and without limitation, to perform a modified zero-velocity drift check, potentially improving measurement capabilities of MWD tool 20.

Figure 5:
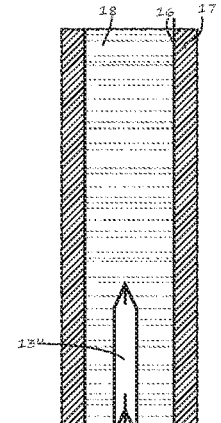
FIG. 5 depicts a heading transfer operation consistent with at least one embodiment of the present disclosure.

In some embodiments, while heading transfer unit 13 is connected to MWD tool 20, a second heading transfer unit 13' may be transferred through drill string 16 above heading transfer unit 13 as depicted in FIG. 5. Heading transfer unit 13 may include upper alignment pin 15. Upper alignment pin 15 may positioned to receive base alignment feature 14' of second heading transfer unit 13'. Upper alignment pin 15 may provide an electromechanical interface for communication between heading transfer unit 13 and second heading transfer unit 13'. Upper alignment pin 15 may be positioned at a known alignment relative to heading transfer unit 13. In some embodiments, upper alignment pin 15 may provide for a known alignment between heading transfer unit 13 and second heading transfer unit 13'.

Once second heading transfer unit 13' reaches heading transfer unit 13, base alignment feature 14' may engage with upper alignment pin 15 of heading transfer unit 13. Second heading transfer unit 13' may be at a known alignment relative to heading transfer unit 13 and MWD tool 20 as discussed above. Second heading transfer unit 13' may communicate the measured heading of second heading transfer unit 13' to MWD tool 20 through heading transfer unit 13. In some embodiments, MWD tool 20 may update or calibrate internally-measured heading to that of second heading transfer unit 13', and may continue operations. Additional heading transfer units 13, such as third heading transfer unit 13", may be further transferred through drill string 16 to engage with previous heading transfer units 13, such as second heading transfer unit 13'. Third heading transfer unit 13" may include base alignment feature 14" positioned to contact upper alignment pin 15' of second heading transfer unit 13'.

Figure 6:
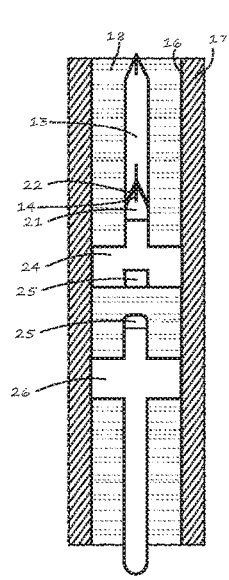
FIG. 6 depicts a heading transfer operation consistent with at least one embodiment of the present disclosure.

In some embodiments, MWD tool 20 may include two or more sections that may be physically separated within the downhole tool in which MWD tool 20 is positioned. In some embodiments, for example and without limitation, MWD tool 20 may include main MWD tool 26 and auxiliary MWD tool 24 as shown in FIG. 6. In some embodiments, main MWD tool 26 and auxiliary MWD tool 24 may have a known relative orientation with respect to each other. In some embodiments, auxiliary MWD tool 24 may contain electronics and mechanical features that enable auxiliary MWD tool 24 to obtain the alignment from heading transfer unit 13, then transfer that heading to main MWD tool 26 through a wired or wireless connection such as, for example and without limitation antennae 25 positioned on auxiliary MWD tool 24 and main MWD tool 26.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the scope of the present disclosure and that they may make various changes, substitutions, and alterations herein without departing from the spirit and scope of the present disclosure.

The invention claimed is:

1. A method comprising:
providing a master north finder, the master north finder positioned at the surface and coupled to a surface base;
determining a heading with respect to true north and gravity with the master north finder;
transferring the heading to a heading transfer unit, the heading transfer unit including:
a non-transitory, tangible, computer readable memory media adapted to store the heading; and
a base alignment feature, the base alignment feature coupleable to the surface base;
transferring the heading transfer unit to a measurement while drilling (MWD) tool by lowering the heading transfer unit through a tubular string by wireline or slickline, the MWD tool including a MWD interface having a MWD interface alignment feature, such that the base alignment feature engages the MWD interface alignment feature; and
transferring the heading from the heading transfer unit to the MWD tool.

2. The method of claim 1, wherein the heading transfer unit further comprises one or more sensors, and wherein the operation further comprises measuring the change in heading of the heading transfer unit as the heading transfer unit is transferred to the MWD tool.

3. The method of claim 2, further comprising using the sensors of the heading transfer unit by the MWD tool.

4. The method of claim 1, wherein transferring the heading to a heading transfer unit comprises coupling the heading transfer unit to the surface base.

5. The method of claim 1, wherein transferring the heading from the heading transfer unit to the MWD tool comprises coupling the base alignment feature to the MWD interface alignment feature.

6. The method of claim 1, wherein the MWD tool comprises a main MWD tool and an auxiliary MWD tool, wherein the MWD interface alignment feature is positioned on the auxiliary MWD tool, the method further comprising transferring the heading from the heading transfer unit to the auxiliary MWD tool.

7. The method of claim 6, further comprising transferring the heading from the auxiliary MWD tool to the main MWD tool.

8. The method of claim 1, further comprising:
determining a second heading with respect to true north and gravity with the master north finder;
transferring the second heading to a second heading transfer unit;
transferring the second heading transfer unit to the MWD tool; and
transferring the second heading from the second heading transfer unit to the MWD tool through the first heading transfer unit.

9. A method comprising:
providing a master north finder, the master north finder positioned at the surface and coupled to a surface base;
determining a heading with respect to true north and gravity with the master north finder;
transferring the heading to a heading transfer unit, the heading transfer unit including:
a non-transitory, tangible, computer readable memory media adapted to store the heading; and
a base alignment feature, the base alignment feature coupleable to the surface base;
transferring the heading transfer unit to a MWD tool by dropping or pumping the heading transfer unit through a tubular string, the MWD tool including a MWD interface having a MWD interface alignment feature, such that the base alignment feature engages the MWD interface alignment feature; and
transferring the heading from the heading transfer unit to the MWD tool.

10. A system comprising:
a surface base;
a master north finder, the master north finder positioned at the surface and coupled to the surface base;

a MWD tool, the MWD tool including a MWD interface, the MWD interface including a MWD interface alignment feature;
a heading transfer unit, the heading transfer unit including:
  a non-transitory, tangible, computer readable memory media adapted to store a heading; and
  a base alignment feature, the base alignment feature coupleable to the surface base and the MWD interface alignment feature, wherein the base alignment feature is a pin, scribe, keyway, hole, slot, groove, or key seat.

11. The system of claim 10, wherein the master north finder having a heading with respect to true north and gravity, wherein the master north finder determines the heading by inertial navigation, gyrocompassing, GPS, or by visual sighting, optics, or land surveying.

12. The system of claim 10, wherein the MWD tool comprises a main MWD tool and an auxiliary MWD tool.

13. The system of claim 12, wherein the auxiliary MWD tool comprises the MWD interface.

14. The system of claim 13, wherein the main MWD tool and auxiliary MWD tool are spaced apart.

15. A system comprising:
a surface base;
a master north finder, the master north finder positioned at the surface and coupled to the surface base;
a MWD tool, the MWD tool including a MWD interface, the MWD interface including a MWD interface alignment feature wherein the MWD interface alignment feature is a pin, scribe, keyway, hole, slot, groove, or key seat;
a heading transfer unit, the heading transfer unit including:
  a non-transitory, tangible, computer readable memory media adapted to store a heading; and
  a base alignment feature, the base alignment feature coupleable to the surface base and the MWD interface alignment feature.

* * * * *